United States Patent [19]

Piper

[11] Patent Number: 4,811,758
[45] Date of Patent: Mar. 14, 1989

[54] PRESSURIZED CHECK VALVE

[75] Inventor: Britton F. Piper, Edmond, Okla.

[73] Assignee: Torus Equipment, Inc., Oklahoma City, Okla.

[21] Appl. No.: 206,609

[22] Filed: Jun. 14, 1988

[51] Int. Cl.$^4$ ............................................. F16K 15/14
[52] U.S. Cl. .................................. 137/844; 137/853; 251/5
[58] Field of Search .................... 251/5; 137/844, 853, 137/493

[56] References Cited

U.S. PATENT DOCUMENTS

| | | | |
|---|---|---|---|
| 3,342,215 | 9/1967 | Griffin | 251/5 X |
| 3,365,009 | 1/1968 | Burnham | 251/5 X |
| 3,955,594 | 5/1976 | Snow | 137/493 X |

FOREIGN PATENT DOCUMENTS 1206721  9/1970  United Kingdom ................. 137/844

Primary Examiner—Robert G. Nilson
Attorney, Agent, or Firm—Glen M. Burdick

[57] ABSTRACT

An improved pressurized fluid check valve is provided which, when incorporated into a drill string powered by a rotary table of a drilling rig, prevents drainage of fluid from the stand pipe and rotary hose when the flow of fluid through the drill string is interrupted, such as during the attachment of another section of drill pipe to the drill string. The improved pressurized fluid check valve comprises (a) a tubular body member having a bore extensive therethrough between first and second end portions thereof, the bore having an enlarged medial portion forming a valve chamber; (b) a flow restricting assembly supported within the valve chamber of the tubular body member for selectively closing the valve chamber to fluid flow in a pressurized mode; and (c) a loading valve supported in an access bore formed through the side wall of the body member so as to communicate with the valve chamber.

The loading valve permits an annular pressure cavity formed between the internal wall of the valve chamber and an elastomeric sleeve of the flow restricting assembly to be pressurized with a gas so that the elastomeric sleeve of the flow retention assembly is compressed to close the valve chamber until such time as the pressure of the fluid flowing through the drill string is sufficient to compress the gas in the annular pressure cavity and permit the elastomeric sleeve to be moved to a noncompressed condition so that the valve chamber is in the open mode.

15 Claims, 2 Drawing Sheets

PRESSURIZED CHECK VALVE

BACKGROUND OF THE INVENTION

1. Field of the Invention

The present invention relates generally to a check valve, and more particularly, but not by way of limitation, to a pressurized check valve assembly positionable on a rotatable drill string for preventing drainage of fluid from a stand pipe and rotary hose of a drilling rig when fluid flow through the drill string is interrupted.

2. Discussion of Prior Art

When drilling oil and gas wells using a rotary drilling rig, drilling fluids are circulated down the drill pipe through the bit and up the outside of the drill pipe. Each time a section of drill pipe is added to the drill string it is necessary to halt or interrupt the flow of the drilling fluids through the drill pipe. In such instances, problems are encountered because of the tendency of the drilling fluid to drain from the stand pipe and rotary hose of the rig.

In an effort to resolve this problem ball valves have been incorporated into the drill string. However, the normal useful life of such ball valves is approximately 325 closures before the seats of the ball valve must be reworked, an expensive and time consuming procedure. For example, 325 connections of drill pipe are required to form a drill string operating at a depth of 9000 feet. That is, the ball valve must be actuated 325 times in order to interrupt the flow of drilling fluid through the drill string when each section of drill pipe is added to the drill string.

Because of the limited useful life of the before-mentioned ball valves, and the expense incurred in the reworking of such valves and replacing same during the drilling operation, a need has long existed for an improved valve assembly which can effectively prevent the drainage of drilling fluid from the stand pipe and rotary hose when the flow of drilling fluid through the drill string is interrupted; and where such valve assembly requires little maintenance and has an extended useful life. Further, because the drill string is rotated during the drilling procedure, it would be highly desirable that such a valve assembly be self-contained and automatically actuated in response to flow pressure of the drilling fluids injected into the drill string. It is to such a check valve assembly that the subject invention is directed.

SUMMARY OF THE INVENTION

According to the present invention an improved pressurized fluid check valve is provided which, when incorporated into a drill string powered by a rotary table of a drilling rig, prevents drainage of fluid from the stand pipe and rotary hose when the flow of fluid through the drill string is interrupted, such as during the attachment of another section of drill pipe to the drill string. Broadly, the improved pressurized fluid check valve of the present invention comprises (a) a tubular body member having a bore extensive therethrough between first and second end portions thereof, the bore having an enlarged medial portion forming a valve chamber; (b) a flow restricting assembly supported within the valve chamber of the tubular body member, the walls of the valve chamber and the flow restricting assembly defining an annular pressure cavity therebetween for selectively closing the valve chamber to fluid flow in a pressurized mode; and (c) a loading valve supported in an access bore formed through the side wall of the body member so as to communicate with the valve chamber.

The loading valve provides for injection of a selected pressurized gas to the pressure cavity so that the pressurized gas automatically actuates the flow restricting assembly and causes same to close the valve chamber to fluid flow until such time that fluid flow therethrough is under sufficient pressure to overcome the pressurizing gas pressure.

The flow restricting assembly comprises an elastomeric sleeve, a sleeve retention member and a piston. The upstream end of the elastomeric sleeve is secured within the tubular body member by the sleeve retention member; and the piston is supported by the downstream end portion of the elastomeric sleeve such that the piston member is slideable along the valve chamber and forms a fluid-tight seal with the internal walls of the tubular body member defining the valve chamber.

An object of the present invention is to provide an improved valve assembly for a rotary drilling rig adapted to prevent drainage of drilling fluid from the stand pipe and rotary hose of the rig when the flow of fluid through the drill string is interrupted.

Another object of the present invention, while achieving the before-mentioned object, is to provide an improved valve assembly for a rotary drilling system which is automatically actuated in response to the flow of fluid through the drill string of the system.

Another object of the present invention, while achieving the before-stated objects, is to provide an improved check valve assembly for a rotary drilling rig adapted to prevent drainage of fluid from the stand pipe and rotary hose of the rig when the flow of fluid through the drill string is interrupted and which is economical to manufacture, durable in construction, has an extended useful life, and overcomes the disadvantages of the valves heretofore employed for such use.

Other objects, features and advantages of the present invention will become clear from the following detailed description when read in conjunction with the drawings and the appended claims.

DETAILED DESCRIPTION

Figure 1:
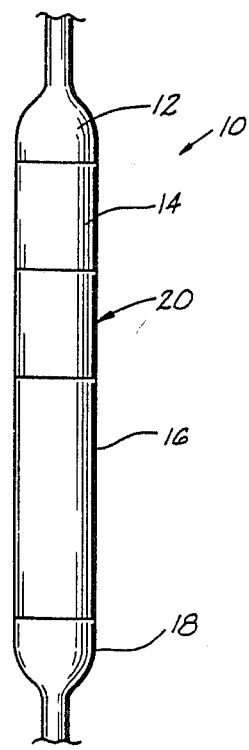
FIG. 1 is a fragmentary, pictorial representation of a portion of a rotating drill string of a rotary drilling rig and illustrating a check valve assembly of the present invention positioned within the drill string between a sub-element and a lower kelly.

Referring now to the drawings, and more particularly to FIG. 1, a section of a rotatable drill string 10 of a drilling rig in which the drill string 10 is rotated by a rotary table (not shown) is illustrated. The drill string 10 includes an upper kelly 12, a sub-element 14, a lower kelly 16, and an upper section of drill pipe 18 of the drilling string 10. All of the above components are standard components of rotary drilling rigs utilizing a rotary table for powering the drill string. Thus, no further comments as to such elements are believed necessary to enable one to fully understand the subject invention which will be set forth in detail hereinafter.

Included within the drill string 10, and positioned between the sub-element 14 and the lower kelly 16, is a pressurized check valve assembly 20 constructed in accordance with the present invention. As will be more fully described in detail hereinafter, the pressurized check valve assembly 20 is automatically actuated by the flow of fluid into the bore hole through the drill string 10 so that when the flow of the drilling fluid is interrupted, such as is required for the addition of a section of drill pipe to the drill string 10, the pressurized check valve assembly 20 is automatically moved to a closed mode. Thus, the pressurized check valve prevents the fluid from draining from the stand pipe and rotary hose of the rig when the flow of fluid through the drill string 10 is interrupted.

Figure 2:
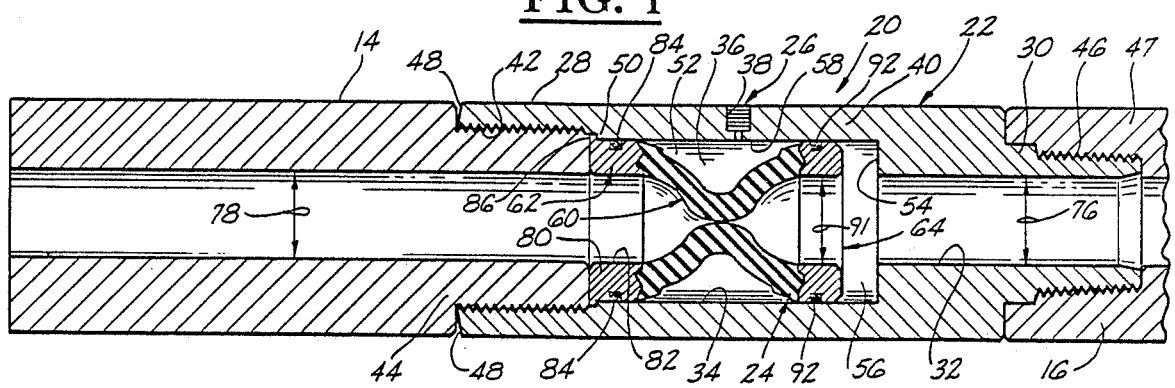
FIG. 2 is a cross-sectional view of a check valve assembly of the present invention wherein an elastomeric sleeve of a flow restricting assembly is in a contracted condition for closing a valve chamber.
Figure 3:
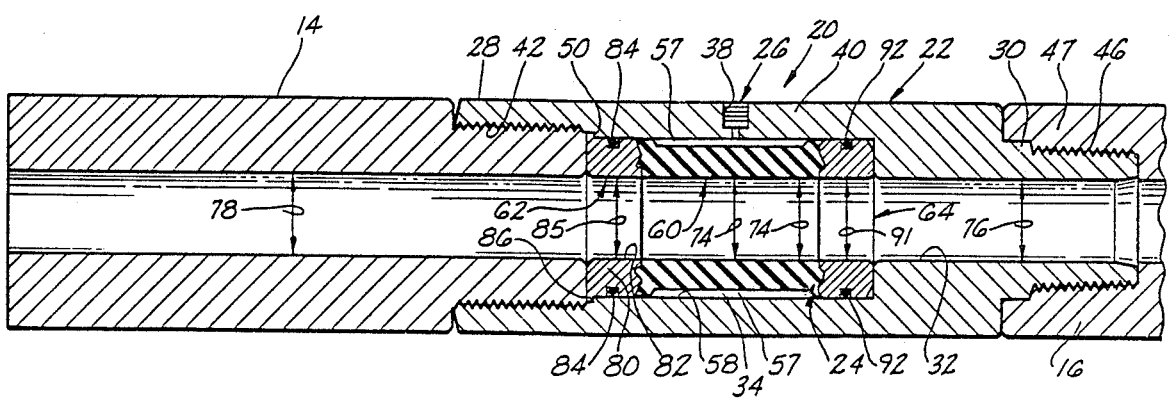
FIG. 3 is a cross-sectional view of the check valve assembly of the present invention wherein the elastomeric sleeve of the flow restricting assembly is in a non-contracted condition for providing unrestricted flow of the fluid through the valve chamber.
Figure 4:
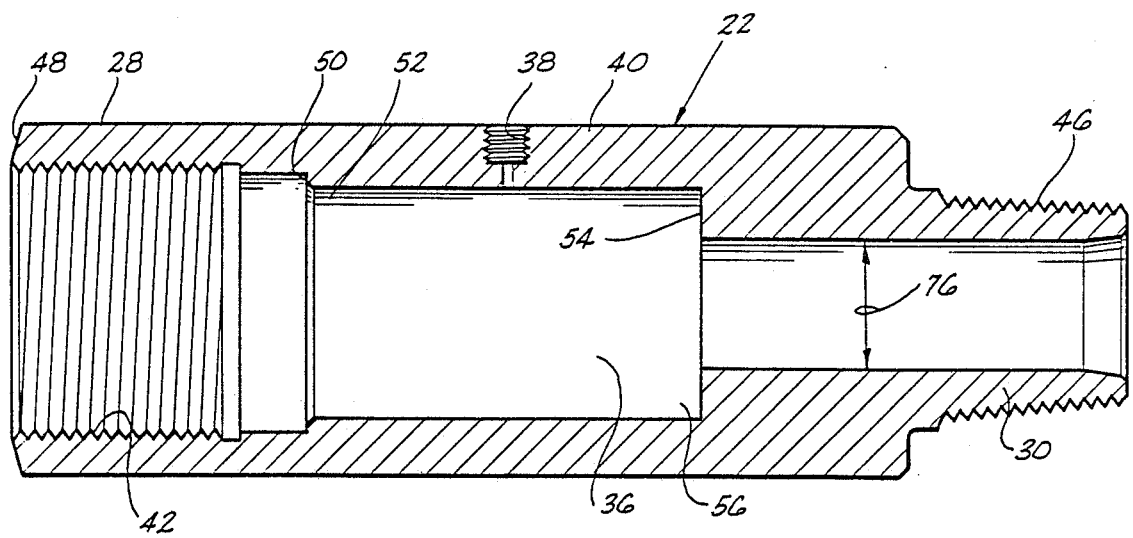
FIG. 4 is a cross-sectional view of a tubular body member forming a housing of the check valve assembly of the present invention.

Referring now to FIGS. 2 and 3, the pressurized check valve assembly 20 comprises a tubular body member 22, a flow restricting assembly 24 supported by the tubular body member 22 and a loading valve 26. The tubular body member 22 (which constitutes a housing for the flow restricting assembly 24) is connectable at a first or upstream end portion 28 to the sub-element 14 and at an opposed second or downstream end portion 30 to the lower kelly 16 (as illustrated) or to the upper section 18 of the drill pipe.

The tubular body member 22 is provided with a bore 32 extensive therethrough between the first and second end portions 28, 30. A medial portion 34 of the bore 32 defines an enlarged valve chamber 36 adapted to receive the flow restricting assembly 24 which selectively closes the valve chamber 36 to fluid flow in a pressurized mode as will be more fully described hereinafter. The tubular body member 22 is also provided with an access bore 38 extending through a wall 40 of the body member 22, the access bore 38 communicating with the valve chamber 36 substantially as shown.

The first end portion 28 of the tubular body member 22 is provided with internally disposed threads 42 for matingly engaging an externally threaded end portion 44 of the sub-element 14; and the second end portion 30 of the tubular body member 22 is an externally threaded end portion 46 for matingly engaging and internally threaded end portion 47 of the lower kelly 16 or the upper section of the drill string, as the case may be, depending on the assembly chosen in the drilling of the well.

Further, the first or upstream end portion 28 of the tubular body member 22 is provided with a tapered surface 48 (approximately 15 degrees as shown in FIGS. 2 and 3) which provides a dove-tailing effect when the upstream end portion 28 of the tubular body member 22 is connected to the threaded end portion 44 of the sub-element 14. The "dove-tailing" of the connection of the tubular body member 22 to the sub-element 14 is important because the pressurized check valve assembly 20 is subjected to internal pressure and the weight load of the drill string 10. Further, the tubular body member 22 of the pressurized check valve assembly 20 is subjected to torque as the check valve assembly 20 is rotated with the drill string 10. The dovetail configuration of the upstream end portion 28 of the tubular body member 22 insures that a constant O.D. is maintained on the tubular body member 22 at the junction of the tubular body member 22 and the sub-element 14, even during limited expansion resulting from the connection of such elements.

The tubular body member 22 is provided with a first shoulder 50 substantially adjacent an upstream end 52 of the valve chamber 36; and the tubular body member 22 is also provided with a second shoulder 54 at a downstream end 56 of the valve chamber 36. The first shoulder 50 and the threaded end portion 44 of the sub-element 14 cooperate to stabilize and secure the flow restricting assembly 24 in the valve chamber 36, while at the same time insuring a fluid-tight seal is formed between the flow restricting assembly 24 and the tubular body member 22; whereas the second shoulder 54, which is formed at the downstream end 56 of the valve chamber 36, is disposed a distance from the first shoulder 50 such that the second shoulder 54 engagingly supports a downstream end portion of the flow restricting assembly 24 when the flow restricting assembly 24 is in the non-compressed state.

As illustrated in FIGS. 2 and 3, the flow restricting assembly 24 is supported in the tubular body member 22 via the first shoulder 50 such that the flow restricting assembly 24 extends into the valve chamber 36 and is adapted to automatically close the valve chamber 36 to fluid flow therethrough when the flow of fluid through the drill string 10 is interrupted (as illustrated in FIG. 2); or to automatically open the valve chamber 36 in response to the pressure of the fluid flowing therethrough (as illustrated in FIG. 3). Thus, the flow restricting assembly 24 is in a normally closed mode until such time as the pressure of the fluid being injected into the formation via the drill string 10 is sufficient to overcome the closure pressure exerted on the flow restricting assembly 24 by pressurized gas in an annular pressure cavity 57 (the annular pressure cavity being formed between the internal wall 58 of the tubular body member 22 defining the valve chamber 36 and the flow restricting assembly 24) and selectively move the flow restricting assembly 24 to the open mode. Further, as will be described in detail hereinafter, the unique construction of the pressurized check valve assembly 20 of the present invention permits the flow restricting assembly 24 to automatically move between the opened and closed position without the need of connecting external lines or equipment to the pressurized check valve assembly 20 except to initially charge same.

The flow restricting assembly 24 comprises an elastomeric sleeve 60, a sleeve retention assembly 62, and an annular piston 64. The elastomeric sleeve 60 is fabricated of rubber or other material having similar characteristics so that the elastomeric sleeve 60 can be compressed and contracted (and thereby close the valve chamber 36 as shown in FIG. 2) or moved by fluid pressure to a non-compressed condition (and thereby open the valve chamber 36 as shown in FIG. 3).

Figure 5:
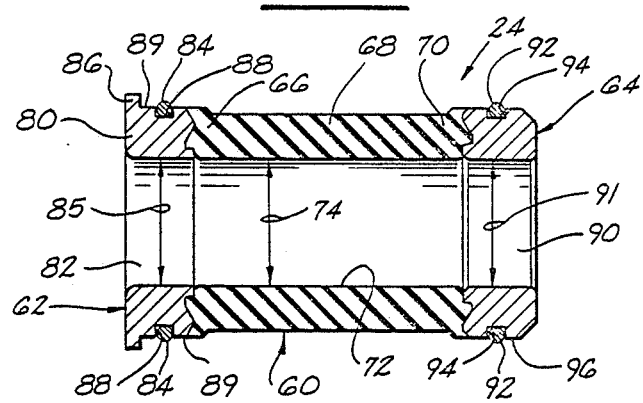
FIG. 5 is a cross-sectional view of the flow restricting assembly of the check valve assembly of the present invention wherein the elastomeric sleeve is in a non-contracted condition.

As more clearly illustrated in FIG. 5, the elastomeric sleeve 60 is an elongated member having an upstream end 66, a medial portion 68 and a downstream end 70.

The elastomeric sleeve 60 is provided with a bore 72 extending therethrough. When the elastomeric sleeve 60 is in a non-compressed state, the bore 72 has an internal diameter 74 substantially corresponding to the internal diameter 76 of the bore 32 of the tubular body member 22 downstream the valve chamber 36 and the internal diameter 78 of the bore of the sub-element 14 upstream of the valve chamber 36 (see FIG. 3). On the other hand, the medial portion 68 of the elastomeric sleeve 60 has an O.D. less than the O.D. of the upstream end 66 and the downstream end 70 of the elastomeric sleeve 60. Thus, the medial portion 68 of the elastomeric sleeve 60 cooperates with the internal wall 58 of the tubular body member 22 forming the valve chamber 36 to provide the annular pressure cavity 57.

The sleeve retention assembly 62, which secures the upstream end 66 of the elastomeric sleeve 60 within the tubular body member 22 comprises an annular ring member 80 having a centrally disposed bore 82 therethrough, and a sealing member 84 supported by the annular ring member 80 for engaging the internal wall 58 of the tubular body member 22 defining the upstream end portion of the valve chamber 36 so that a fluid-tight seal is formed therebetween. The bore 82 of the annular ring member 80 has an internal diameter 85 corresponding to the diameter 74 of the elastomeric sleeve 60 when the elastomeric sleeve 60 is in the non-compressed condition.

The annular ring member 80 is further provided with a uneven surface along its downstream end portion (substantially as shown) for enhancing the bonding of the upstream end 66 of the elastomeric sleeve 60 to the annular ring member 80. Any suitable means known in the art for bonding the upstream end 66 of the elastomeric sleeve 60 to the annular ring member 80 can be employed.

The annular ring member 80 is also provided with a lip portion 86 disposed about the upstream end, the lip portion 86 engaging the first shoulder 50 formed in the tubular body member 22 substantially adjacent the upstream end portion of the valve chamber 36. Further, the annular ring member 80 is provided with an externally disposed annular groove 88 formed in one external sidewall 89, the annular groove 88 adapted to receive the sealing member 84, such as an O-ring. Thus, in the assembled position the O-ring engages the internal wall 58 of the tubular body member 22 defining the enlarged valve chamber 36 to form a fluid-tight seal therebetween.

The annular piston 64 is bonded by any suitable means to the downstream end 70 of the elastomeric sleeve 60. The upstream end of the annular piston 64 is provided with an uneven surface along its upstream end portion (substantially as shown) for enhancing the bonding of the downstream end 70 of the elastomeric sleeve 60 thereto. As with the annular ring member 80, the annular piston 64 can be bonded to the elastomeric sleeve by any means known in the art.

The annular piston 64, which is slideably movable through the valve chamber 36, is provided with a centrally disposed bore 90 extending therethrough, the bore 90 having an internal diameter 91 corresponding to the diameter 74 of the elastomeric sleeve 60 when the elastomeric sleeve 60 is in the non-compressed state. Thus, the bores 72, 82 and 90 of the elastomeric sleeve 60, the annular ring member 80 of the sleeve retention assembly 62 and the annular piston 64, respectively, provide a continuous flow path for the fluid injected into the well when the elastomeric sleeve 60 is in the non-compressed condition and the valve chamber 36 is thus in the open mode.

In order to provide the fluid-tight seal between the annular piston 64 and the internal wall 58 defining the valve chamber 36, while at the same time permitting the annular piston 64 to be slideably moved along the internal wall 58 defining the valve chamber 36 in response to the compression of the medial portion 68 of the elastomeric sleeve 60, the annular piston 64 is provided with a sealing member 92. The sealing member 92, an O-ring, is positioned within an annular groove 94 formed in an external side wall 96 of the annular piston 64. Thus, the O-ring engages the internal wall 58 of the tubular body member 22 defining the valve chamber 36 and forms a fluid-tight seal therebetween, while permitting the annular piston 64 to be moved in a to and fro direction in response to the pressure of fluid flowing through the bore 62 of the elastomeric sleeve 60.

It should be noted that the length of the elastomeric sleeve 60 and the annular piston 64 is equal to or less than the axial length of the valve chamber 36. Thus, when the elastomeric sleeve 60 is in the non-compressed condition the annular piston 64 is either disposed above the second shoulder 54 or supported thereon, and the internal diameter 74 of the bore 72 of the elastomeric sleeve 60 corresponds in size to the internal diameters of the bores of the downstream end of the tubular body member 22, the sleeve retention assembly 62, the annular piston 64, the sub-element 14 and the lower kelly 16 or the drill pipe.

Referring again to FIGS. 2 and 3, the loading valve 26 for pressurizing the annular pressure cavity 57 is secured within the access bore 38 of the tubular body member 22 such that an effective seal is provided therebetween. For example, the loading valve 26 is provided with external threads which matingly engage threads of the access bore 38. Further, the thickness of the wall 40 is such that when the loading valve 26 is disposed within the access bore 38 a contiguous outer surface is provided. Thus, the loading valve 26 effectively seals the access bore 38 while at the same time providing a means to effectively charge the annular pressure cavity 57 with a predetermined amount of a gas to close the valve chamber 36. However, when a fluid, such as a drilling mud, is injected into the drill string the operating pressure of the pumps injecting the fluid is sufficient to overcome the pressure of the gas in the annular pressure cavity 57. When such occurs, the gas is compressed into the annular pressure cavity 57 and the elastomeric sleeve 60 is positioned in the non-compressed condition so that the valve chamber 36 is in the open mode. When the fluid flow through the valve chamber 36 is halted or interrupted the compressed gas in the annular pressure cavity 57 will be permitted to expand and thus automatically move the medial portion 68 of the elastomeric sleeve 60 to the compressed condition to close the valve chamber 36. Any suitable valve capable of charging the annular pressure cavity 57 to a predetermined pressure of gas, and at the same time seal the access bore 38 to maintain the gas within the annular pressure cavity 57 can be employed. However, desirable results have been obtained wherein the loading valve 26 is a Schrader Loading Valve No. 3642, manufactured by Schrader Valve Company of Memphis, Tenn.

It is believed that the operation of the pressurized check valve assembly 20 of the present invention will be apparent so that only a brief description thereof will be necessary. When the pressurized check valve assembly 20 is incorporated into the drill string 10 of a drilling rig, the loading valve 26 is positioned within the access bore 38 of the tubular body member 22, and the elastomeric sleeve 60 is disposed within the valve chamber 36 such that the annular piston 64 is disposed in the downstream portion of the valve chamber 36 and the sleeve retention assembly 62 is in supporting engagement with the first shoulder 50. Thereafter, the sub-element is threadably connected to the upstream end portion 28 of the tubular body member 22 so that the sleeve retention assembly 62 is secured in a stable position on the first shoulder 50.

An air chuck (not shown) is connected to the loading valve 26 and the annular pressure cavity 57 charged with an effective amount of gas, such as air supplied by the rig (i.e. rig air), or a bottled gas such as nitrogen. The amount of gas charged to the annular pressure cavity 57 can vary depending upon the properties of the elastomeric sleeve 60, but will generally be in an amount effective to provide about 120 pounds of pre-charged gas to the annular pressure cavity 57.

During the charging of the gas to the annular pressure cavity 57 the gas will expand and cause the medial portion 68 of the elastomeric sleeve 60 to contract and/or compress and effectively close the valve chamber 36. When the flow of a drilling fluid, such as drilling mud, is commenced through the drill string 10, the pressure of the drilling fluid contacting the compressed medial portion 68 of the elastomeric sleeve 60 will override the pressure of the gas on the medial portion 68 of the elastomeric sleeve 60 and commence to open the valve chamber 36 until such time as the fluid flowing therethrough has sufficient pressure to fully extend the medial portion 68 of the elastomeric sleeve 60 and provide the bore therethrough with unrestricted flow. Because of the unique construction of the check valve assembly 20 of the present invention, the precharged, pressurized gas in the annular pressure cavity 57 can be compressed or permitted to expand dependent solely upon the pressure of the fluid being injected through the valve chamber 36 of the check valve assembly 20.

When it is determined that it is desirable to run a survey tool through the drill string, one need not remove the pressurized check valve assembly 20, but only remove the pressure of the gas in the annular pressure cavity 57. When the pressure of the gas is removed the elastomeric sleeve 60 will return to the non-compressed state. Once the survey or other operation has been completed, one can return the pressurized check valve assembly 20 to service by merely charging the annular pressure cavity 57 with the predetermined amount of gas via the loading valve 26.

The pressurized check valve assembly 20 of the present invention is not only durable in construction and substantially maintenance free, but is also economical to manufacture. Further, it is clear that the present invention is well adapted to carry out the objects and attain the ends and advantages mentioned herein as well as those inherent in the invention. While a presently preferred embodiment of the invention has been described for the purposes of this disclosure, numerous changes may be made which will readily suggest themselves to those skilled in the art and which are accomplished within the spirit of the invention disclosed and as defined in the appended claims.

What is claimed is:

1. A pressurized check valve assembly positionable on a rotatable drill string powered by a rotary table of a drilling rig, the check valve assembly adapted to prevent drainage of fluid from a standpipe and rotary hose when the flow of fluid through the drill string is interrupted, the pressurized check valve assembly comprising:

tubular body member having a first end portion, an opposed second end portion, and a bore extensive therethrough, a medial portion of the bore defining an enlarged valve chamber, the tubular body member further having an access bore extending through a sidewall thereof such that the access bore communicates with the valve chamber;

flow restricting means supported in the valve chamber by the tubular body member for automatically closing the valve chamber to fluid flow when the flow of fluid therethrough is interrupted, the flow restricting means automatically opening the valve chamber in response to the flow of fluid therethrough, the flow restricting means comprising:

an elastomeric sleeve having an upstream end, a medial portion and a downstream end, the elastomeric sleeve defining a bore therethrough which, when the elastomeric sleeve is in a non-compressed state, substantially corresponds in diameter to the diameter of a portion of the bore of the tubular body member downstream of the valve chamber;

sleeve retention means supported by the tubular body member for securing the upstream end of the elastomeric sleeve substantially adjacent the valve chamber such that the medial portion and downstream end of the elastomeric sleeve are disposed within the valve chamber, the medial portion of the elastomeric sleeve cooperating with the internal wall of the valve chamber to form an annular pressure cavity which communicates with the access bore; and an annular piston supported by the downstream end of the elastomeric sleeve, the annular piston slideably moveable through the valve chamber and forming a fluid-tight seal with the internal wall of the valve body defining the valve chamber, and loading valve means supported in the access bore for sealing the access bore and for permitting the annular pressure cavity to be charged to a predetermined pressure with a gas, the pressurized gas in the annular pressure cavity causing the elastomeric sleeve to restrict and thereby close the valve chamber to fluid flow therethrough until such time as the pressure of fluid injected through the tubular body member is under pressure sufficient to overcome the pressure of the pressurized gas in the annular pressure cavity.

2. The pressurized check valve assembly of claim 1 wherein the first end portion of the tubular body member is provided with internally disposed threads for matingly engaging an externally threaded end portion of a sub-element of the drilling rig, and wherein the tubular body member further comprises:

first shoulder means formed within the tubular body member substantially adjacent the upstream end of the valve chamber for receiving and supporting the sleeve retention means, the first shoulder means and the threaded end portion of the sub-element cooperating to stabilize the sleeve retention means such that a fluid-tight seal is formed between the sleeve retention means, the first seal is formed between the sleeve retention means, the first shoulder means, and the internal wall of the body member defining the peripheral portion of the first shoulder means.

3. The pressurized check valve assembly of claim 2 wherein the sleeve retention means comprises:
an annular ring member having a centrally disposed bore extending therethrough substantially corresponding in size to the diameter of the bore of the elastomeric sleeve when same is in the non-compressed state; and
sleeve retention sealing means supported by the annular ring member for engaging the internal wall of the body member and forming a fluid-tight seal therebetween.

4. The pressurized check valve assembly of claim 3 wherein the annular ring member is provided with an externally disposed annular groove, and wherein the sleeve retention sealing means comprises:
an O-ring disposed within the annular groove of the annular ring member such that in an assembled position the O-ring engages the internal wall of the body member to form the fluid-tight seal therebetween.

5. The pressurized check valve assembly of claim 4 wherein the second end portion of the tubular body member is provided with externally disposed threads for matingly engaging internally disposed threads on one end of a member forming the drill string, and wherein the tubular body member further comprises:
second shoulder means formed in the downstream end of the valve chamber for supporting the annular piston when the elastomeric sleeve is in the non-compressed state, the second shoulder means having a bore extending therethrough substantially corresponding in size to the internal diameter of the elastomeric sleeve when same is in the non-compressed state.

6. The pressurized check valve assembly of claim 5 wherein the annular piston further comprises piston sealing means supported by the annular piston for engaging the internal wall of the body member defining the valve chamber and forming a fluid-tight seal therebetween.

7. The pressurized check valve assembly of claim 6 wherein the annular piston is provided with an externally disposed annular groove and a centrally disposed bore extending therethrough, the bore of the annular piston substantially corresponding in size to the diameter of the bore of the elastomeric sleeve when same is in the non-compressed state, and wherein the piston sealing means comprises:
an O-ring disposed within the annular groove of the piston such that in an assembled position the O-ring engages the internal wall of the body member defining the enlarged valve chamber to form a fluid-tight seal therebetween while permitting the piston to move in a to and fro direction in response to the pressure of fluid flow therethrough.

8. The pressurized check valve assembly of claim 7 further comprising:
first connecting means for connecting the upstream end portion of the elastomeric sleeve to the annular ring member of the sleeve retention means; and
second connecting means for connecting the downstream end portion of the elastomeric sleeve to the annular piston.

9. A pressurized fluid check valve assembly comprising:
a tubular body member having a bore extensive therethrough between first and second end portions thereof, the bore having an enlarged medial portion forming a valve chamber and an access bore extending through the wall of the body member communicating with the valve chamber;
flow restricting means supported by the body member in the valve chamber for selectively closing the valve chamber to fluid flow in a pressurized mode, the flow restricting means comprising:
an elastomeric sleeve;
sleeve retention means for securing one end of the elastomeric sleeve at an upstream end of the valve chamber; and
an annular piston supported by the elastomeric sleeve at its downstream end for slideably supporting same in the valve chamber and engaging the internal wall of the valve chamber, an annular pressure cavity formed about the elastomeric sleeve and between the sleeve retention means, the annular piston and the internal wall of the valve chamber, the access bore communicating with the annular pressure cavity; and
loading valve means supported in the access bore for permitting the injection of a selected pressurizing gas to the pressure cavity and retaining a pressurized mode thereof so that the elastomeric sleeve is caused to restrict and thereby close the valve chamber to fluid flow unless such fluid is under pressure sufficient to overcome the pressurizing gas pressure.

10. The pressurized check valve assembly of claim 9 wherein the first end portion of the tubular body member is provided with internally disposed threads for matingly engaging an externally threaded end portion of a sub-element of the drilling rig, the second end portion of the tubular body member is provided with externally disposed threads for matingly engaging internally disposed threads on an upper end of an uppermost member forming a drill string, and wherein the tubular body member further comprises:
first shoulder means formed within the tubular body member substantially adjacent an upstream end of the valve chamber for receiving and supporting the sleeve retention means, the first shoulder means and the threaded end portion of the sub-element cooperating to stabilize the sleeve retention means such that a fluid-tight seal is formed between the sleeve retention means, the first seal is formed between the sleeve retention means, the first shoulder means, and the internal wall of the body member defining the peripheral portion of the first shoulder means; and
second shoulder means formed in the downstream end of the valve chamber for supporting the annular piston when the elastomeric sleeve is in the non-compressed state, the second shoulder means having a bore extending therethrough substantially corresponding in size to the internal diameter of the elastomeric sleeve when same is in the non-compressed state.

11. The pressurized check valve assembly of claim wherein the sleeve retention means comprises:

an annular ring member having a centrally disposed bore extending therethrough substantially corresponding in size to the diameter of the bore of the elastomeric sleeve when same is in the non-compressed state; and sleeve retention sealing means supported by the annular ring member for engaging the internal wall of the body member and forming a fluid-tight seal therebetween.

12. The pressurized check valve assembly of claim 10 wherein the annular ring member is provided with an externally disposed annular groove, and wherein the sleeve retention sealing means comprises:

an O-ring disposed within the annular groove of the annular ring member such that in an assembled position the O-ring engages the internal wall of the body member to form the fluid-tight seal therebetween.

13. The pressurized check valve assembly of claim 11 wherein the annular piston further comprises piston sealing means supported by the annular piston for engaging the internal wall of the body member defining the valve chamber and forming a fluid-tight seal therebetween.

14. The pressurized check valve assembly of claim 13 wherein the annular piston is provided with an externally disposed annular groove and a centrally disposed bore extending therethrough, the bore of the annular piston substantially corresponding in size to the diameter of the bore of the elastomeric sleeve when same is in the non-compressed state, and wherein the piston sealing means comprises:

an O-ring disposed within the annular groove of the piston such that in an assembled position the O-ring engages the internal wall of the body member defining the enlarged valve chamber to form a fluid-tight seal therebetween while permitting the piston to move in a to and fro direction in response to the pressure of fluid flow therethrough.

15. The pressurized check valve assembly of claim 9 further comprising:

first connecting means for connecting the upstream end portion of the elastomeric sleeve to the sleeve retention means; and second connecting means for connecting the downstream end portion of the elastomeric sleeve to the annular piston.

* * * * *

UNITED STATES PATENT AND TRADEMARK OFFICE
CERTIFICATE OF CORRECTION

PATENT NO. : 4,811,758

DATED : March 14, 1989

INVENTOR(S) : Britton F. Piper

It is certified that error appears in the above-identified patent and that said Letters Patent is hereby corrected as shown below:

In claim 1, column 8, line 8, "tubular body" should read --a tubular body--. In claim 11, column 10, line 67, "claim" should read --claim 10--. In claim 12, column 11, line 10, "claim" should read --claim 11--.

Signed and Sealed this

Twenty-fourth Day of July, 1990

Attest:

HARRY F. MANBECK, JR.

*Attesting Officer*    *Commissioner of Patents and Trademarks*